United States Patent [19]
Benton

[11] Patent Number: 5,279,430
[45] Date of Patent: Jan. 18, 1994

[54] STORAGE RACK WITH WIRE TRACK BEAM

[75] Inventor: Richard E. Benton, Springfield, Tenn.

[73] Assignee: UNR Industries, Inc., Chicago, Ill.

[21] Appl. No.: 61,214

[22] Filed: May 13, 1993

[51] Int. Cl.$^5$ .............................................. A47E 5/00
[52] U.S. Cl. .................................. 211/151; 211/59.2; 211/187
[58] Field of Search ...................... 211/59.2, 151, 186, 211/187, 153, 26

[56] References Cited

U.S. PATENT DOCUMENTS

| | | | |
|---|---|---|---|
| 3,900,112 | 8/1975 | Azzi et al. | 211/151 X |
| 4,372,451 | 2/1983 | Rasmussen et al. | 211/187 |
| 4,383,614 | 5/1983 | Miller | 211/151 X |
| 4,553,674 | 11/1985 | Yoshikawa et al. | 211/26 |
| 5,114,016 | 5/1992 | Todd | 211/26 |
| 5,115,920 | 5/1992 | Tipton et al. | 211/151 X |
| 5,201,429 | 4/1993 | Hikosaka et al. | 211/59.2 |

OTHER PUBLICATIONS

Unarco Material Handling Systems, Easypick ™ Paperless Picking Systems Brochure, undated but prior to May 13, 1993.

Unarco Material Handling Systems, Order Picking Systems Brochure, 1991.

*Primary Examiner*—Robert W. Gibson, Jr.
*Attorney, Agent, or Firm*—Dressler, Goldsmith, Shore & Milnamow, Ltd.

[57] ABSTRACT

A storage rack with novel front and rear beams is disclosed. The beams are inverted generally V-shaped channels which roll on to side beams to form the shelf. The front and rear beams are secured into the side beams by interlocking projections and notches. The front and rear beams can span one or more bays of storage racks and a use simplified design to facilitate assembly. The front and rear beams, being continuous across one or more bays or racks, provide a track for wire or cable to traverse a part of, or the entire length of the storage rack. The wire or cable traversing the beams can connect electrical inventory control devices without the need for external cables or wire conduit.

16 Claims, 3 Drawing Sheets

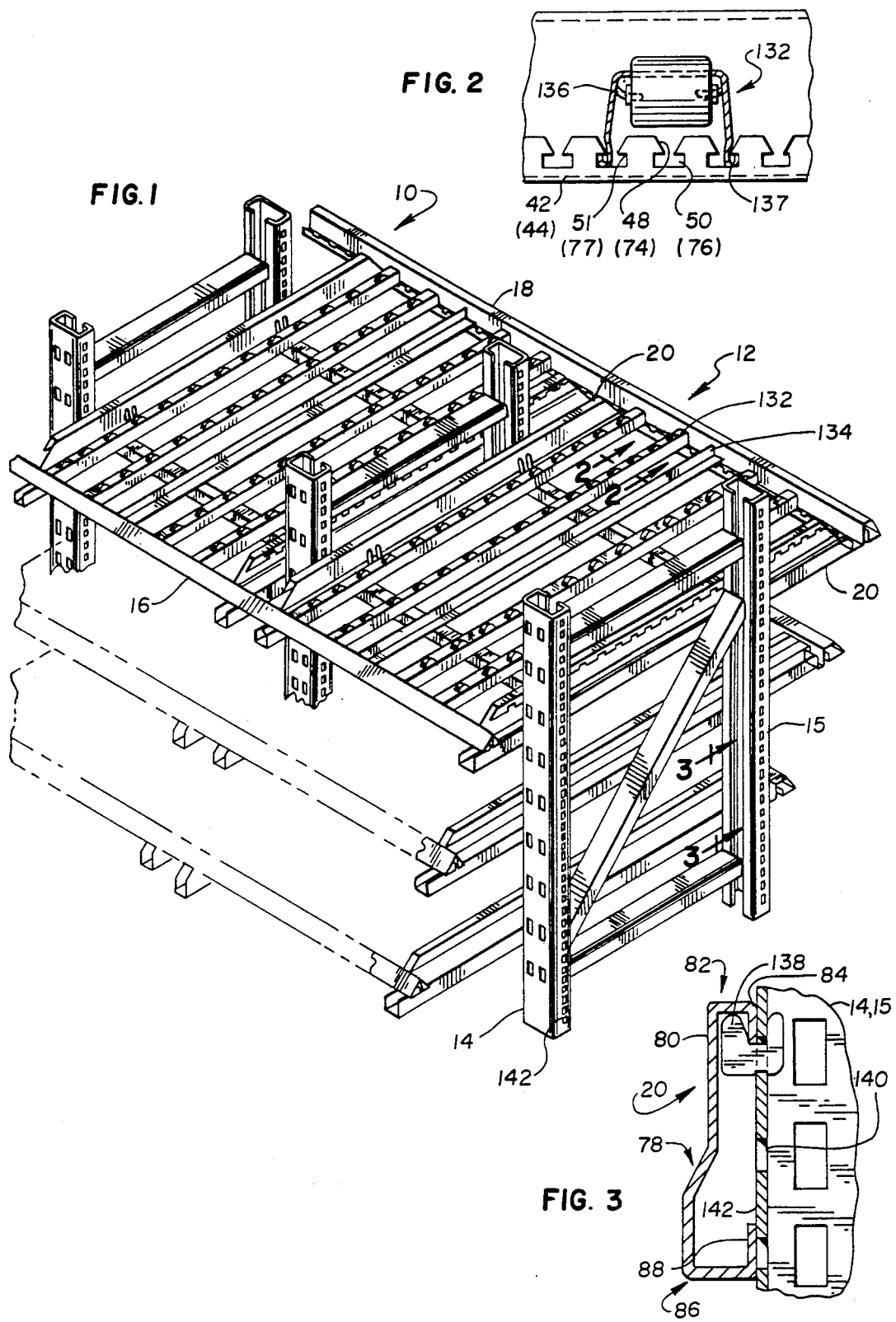

5,279,430

STORAGE RACK WITH WIRE TRACK BEAM

FIELD OF THE INVENTION

This invention pertains to storage racks; more particularly, this invention pertains to a storage rack with a novel, continuous, front or rear beam which can span one or more bays of the storage rack, which can be installed through a simple roll-on action, and which can define a wire track within the beam.

BACKGROUND OF THE INVENTION

Storage racks are commonly known in the art. Variations of standard storage racks include roller tracks to facilitate access to items stored on the racks. Other variations of these storage racks have shelves which are mounted in an inclined orientation to further ease access to items on the shelves.

The prior art storage racks, however, comprise discrete bays. Because of this design, wires or cables, which are often needed to traverse the bays, must be routed in separate cable ways or wire tracks, which are mounted to the storage racks. Such cable ways or wire tracks increase the material and assembly costs for installing storage racks.

SUMMARY OF THE INVENTION

This invention provides improvements in design and construction of storage racks. As improved by this invention, the front and rear shelf beams of storage racks can be fabricated as a single channel which spans the length of one or more bays of the rack and which can be installed through a simple roll-on action. The front or rear beam can be used as a wire track to preclude the need for additional or external wire conduit.

This simplified beam construction provides an improvement over the commonly known, discrete, modular storage racks. The front and rear beams of the storage rack of this invention can be integrated along the length of the storage rack providing a more structurally stable rack system.

In a preferred construction, the storage rack shelf has a front beam, a rear beam, and side beams. The front and rear beams span at least two adjacent bays. The front and rear beams are of an inverted generally V-shape. Each of the front and rear beams has an internal lip formed by a horizontal and upturned vertical wall. The horizontal wall has apertures, spaced at equal distances from each other, along its length. The horizontal and vertical walls define a space internal to the generally V-shaped channel. The internal space can be used as a track for wire or cable traversing a part of, or the entire length of the beam.

In the preferred construction, the front and rear beams have an external lip formed from the leg opposite that which forms the internal lip. The external lip has a horizontal wall and an upturned vertical wall. The vertical wall has alternating upright generally T-shaped projections and inverted generally T-shaped notches along its length.

In the preferred construction, the side beams are generally C-shaped with an offset in the vertical leg. The front and rear portions of the side beams have notches defined by a continuous horizontal and upturned vertical slot. The notches in the side beams engage the notches in the front and rear beams between the generally T-shaped projections.

Roller tracks, dividers, and other similar storage rack accessory items can be disposed between the front and rear beams to facilitate use of the rack.

The preferred arrangement also provides for a plurality of storage rack shelves mounted in horizontal or inclined fashion to front and rear upright support columns to form a storage rack.

These and other objects, features, and advantages of this invention are evident from the following description of the preferred embodiment of this invention with reference to the accompanying drawings.

BRIEF DESCRIPTION OF THE DRAWINGS

FIG. 1 is a perspective view of a preferred embodiment of a storage rack of the present invention, showing the uppermost shelf with the front and rear beams common among a least two shelves;

FIG. 2 is a partial elevational view of a representative one of the front or rear beams showing, in cross section, a roller track engaged in the upright generally T-shaped projections of the illustrated beam;

FIG. 3 is a partial cross sectional view of a side beam and vertical support column showing a U-clip for engaging the side beam and support column;

DETAILED DESCRIPTION OF PREFERRED EMBODIMENT

Figure 4:
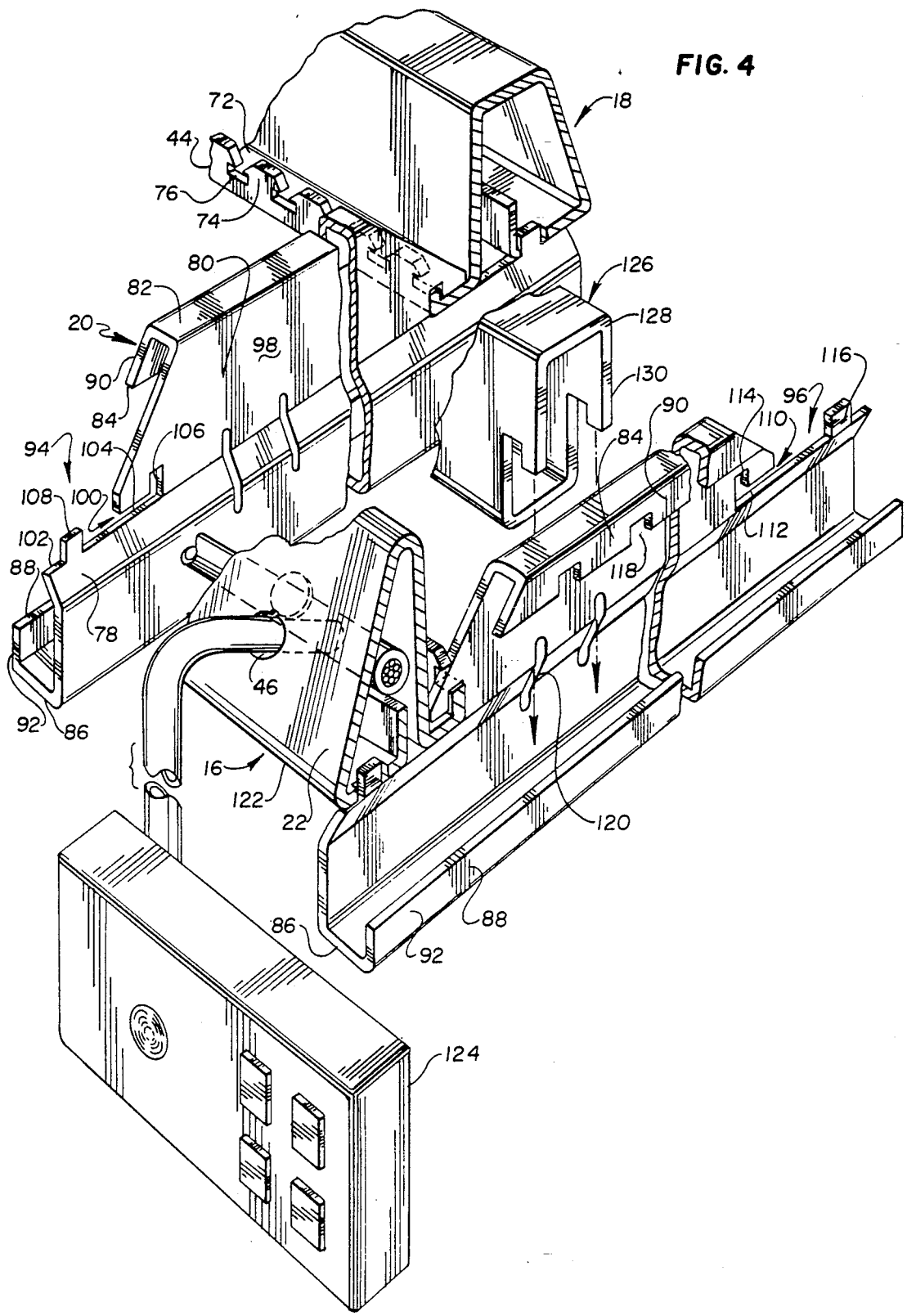
FIG. 4 is perspective view, in partial cross section, of front, rear and side beams, a transverse support member, and a portion of wire or cable passing through the wire track of the front beam, along with an electrical box.

As shown generally in FIG. 1, a storage rack 10 constituting a preferred embodiment of this invention has a plurality of horizontal, vertically staggered shelves 12 mounted to front and rear upright support columns 14, 15. Each shelf 12 has a front beam 16, a rear beam 18 and at least two side beams 20. As illustrated in FIG. 1, the front and rear beams 16, 18 can span a plurality of bays. Each bay is defined as the storage space between adjacent pairs of support columns 14, 15, on one or more shelves 12.

Figure 5:
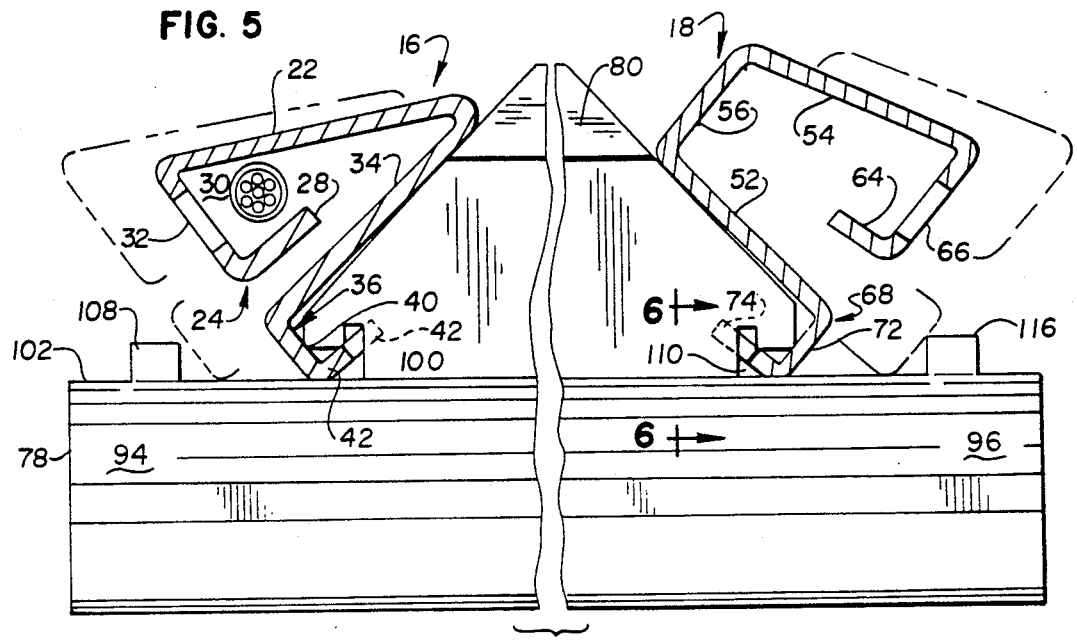
FIG. 5 is a partial cross sectional view of front and rear beams engaging a side beam, with a cable located in the wire track of the front beam.
Figure 6:
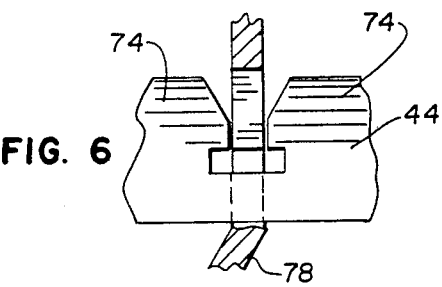
FIG. 6 is a partial front view, across line 6—6 of FIG. 5, showing a front (or rear) beam engaging a side beam.
Figure 7:
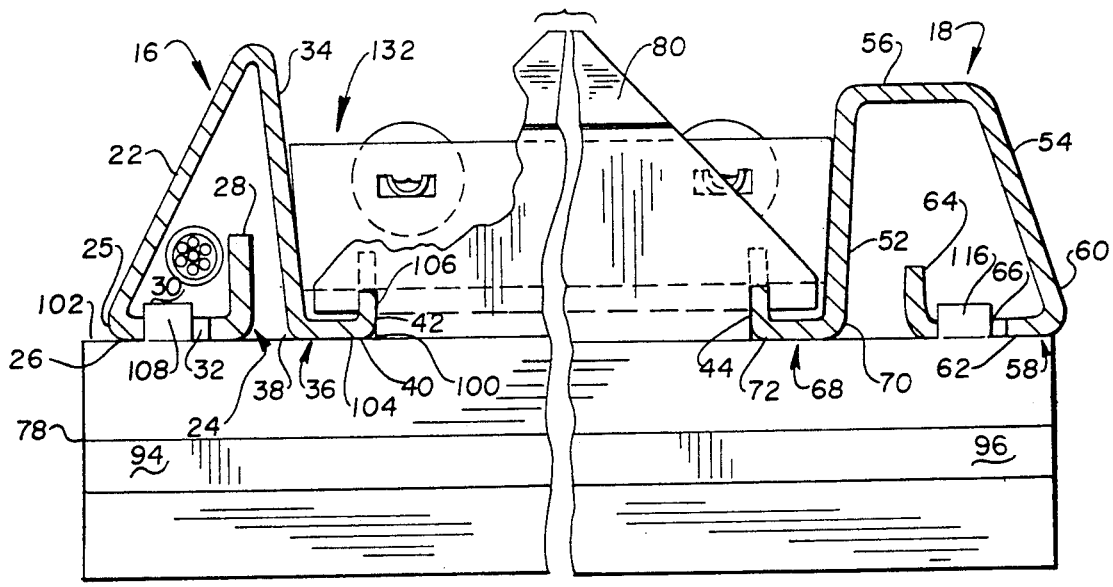
FIG. 7 is the partial cross sectional view, as shown in FIG. 5, with the front and rear beams fully engaged in the side beam and a roller track disposed between the front and rear beams.

A front beam 16, shown generally in FIGS. 4, 5 and 7, is an inverted generally V-shaped channel. The front beam 16 has an internal lip 24 extending from the bottom 25 of the front leg 22. The internal lip 24 has a horizontal wall 26 terminating in an upturned vertical wall 28. The front leg 22 and the internal lip 24 define a wire track 30, internal to the front beam 16. The horizontal wall 26 of the front beam 16 has apertures 32, equally spaced from each other, along its length.

The front beam 16 has a rear leg 34, forming the second side of the inverted V-shape. An external lip 36 extends from the bottom 38 of the rear leg 34 and has a horizontal wall 40 which terminates in an upturned vertical wall 42. As shown in FIG. 2, which illustrates the upturned vertical wall 42 of the front beam 16, and the upturned vertical wall 44 of the rear beam 18, the upturned vertical wall 42 of the front beam 16 has alternating upright generally T-shaped projections 48 and inverted generally T-shaped notches 50 which form shoulders 51 at the under side of the T-shaped projections 48. The front beam 16 has apertures 46 through the front leg 22, spaced at equal distances from each other, along the length of the beam 16.

The rear beam 18, as shown in FIGS. 4, 5 and 7, is an inverted generally V-shaped channel. The rear beam 18 has a front leg 52 and a rear leg 54. An elongated horizontal wall 56 is formed between the front leg 52 and the rear leg 54. The rear beam 18 has an internal lip 58 extending from the bottom 60 of the rear leg 54. The internal lip 58 has a horizontal wall 62 terminating in an upturned vertical wall 64. The horizontal wall 62 has apertures 66, spaced at equal distances from each other, along its length.

The front leg 52 of the rear beam 18 has an external lip 68 extending from the bottom 70 of the front leg 52. The external lip 68 has a horizontal wall 72 which terminates in an upturned vertical wall 44. As shown generally in FIG. 2, where part numbers are shown in parentheses, the vertical wall 44 of the rear beam 18 has alternating upright generally T-shaped projections 74 and inverted generally T-shaped notches 76. Shoulders 77 are formed at the under side of the T-shaped projections.

Each side beam 20, shown generally in FIGS. 1 and 3 through 7, is a generally C-shaped channel with an offset 78 in the vertical leg 80. The side beam 20 has an upper horizontal wall 82 which terminates in a downturned flange portion 84. Similarly, the side beam 20 has a lower horizontal wall 86 which terminates in an upturned flange portion 88. The outermost surface 90 of the downturned flange portion 84 and the outermost surface 92 of the upturned flange portion 88 are coplanar. The side beam 20 extends the depth of the shelf 12, and has a front portion 94 and a rear portion 96.

As best seen in FIGS. 5 and 7, the front 94 of the top portion 98 of side beam 20, above the offset 78, is formed at an angle β to the horizontal. A notch 100 is formed in the front 94 of top portion 98 at the uppermost point 102 of the offset 78. The notch 100 has a horizontal slot 104 contiguous with an upturned vertical slot 106 extending into the top portion 98 of the beam 20. A lug 108 extends upward from the uppermost point 102 of the offset 78 at a location forward of the notch 100.

The rear portion 96 of the side beam 20 is formed like the front portion 94. The rear 96 of the top portion 98 of side beam 20 is formed at an angle θ to the horizontal. A notch 110 is formed in the top portion 98 of the rear 96 of beam 20 at the uppermost point 102 of the offset 78. The notch 110 has a horizontal slot 112 contiguous with an upturned vertical slot 114 extending into the top portion 98 of the beam 20. A lug 116 extends upward from the uppermost point 102 of the offset 78 at a location rear of the notch 110.

Referring to FIG. 4, the side beam 20 has regularly spaced notches 118 formed along the downturned flanqe portion 84. The vertical leg 80 of the side beam 20 has vertical slots 120 from a point above the offset 78 to a point below the offset 78.

In assembly of the shelf 12, each front beam 16 is rolled onto the side beam 20 as shown generally in FIG. 5. The rear leg 34 of the front beam 16 is held at an angle approximately equal to angle β, as shown in the broken line of FIG. 5. An inverted generally T-shaped notch 50 of the upturned vertical wall 42 must be in alignment with the notch 100 of the side beam 20. The front beam 16 is then moved inward, perpendicular to the side beam 20, such that the rear leg 34 lies flush with the top portion 98 of the front 94 of the side beam 20. The front beam is then rolled in a downward motion, as shown by the arrow in FIG. 7, such that the notch 100 of side beam 20 engages lip 36 between two of the upright generally T-shaped projections 48 of the front beam 16, and a lug 108 of side beam 20 extends through one of the apertures 32 of the front beam 16.

Each rear beam 18 is rolled onto the side beam similarly. The front leg 52 of the rear beam 18 is held at an angle approximately equal to angle θ, as shown in the broken line of FIG. 5. An inverted generally T-shaped notch 76 of the upturned vertical wall 44 must be in alignment with the notch 110 of the side beam 20. The rear beam 18 is then moved inward, perpendicular to the side beam 20, such that the front leg 52 lies flush with the top portion 98 of the rear 96 of the side beam 20. The rear beam is then rolled in a downward motion, as shown by the arrow in FIG. 7, such that the notch 110 of side beam 20 engages lip 68 between two of the upright generally T-shaped projections 74 of the rear beam 18, and a lug 108 of side beam 20 extends through one of the apertures 66 of the rear beam 18.

Wire or cable 122 can be pulled though the wire track 30, which is formed internal to the front beam 16. Apertures 46 located along the front leg 22 of the front beam 16 provide access for the wire or cable 122 to be pulled out of the beam 16, and connected to an electrical box 124 locally or remotely mounted. The electrical box 124 can be used for inventory monitoring and control of items stored on the storage rack 10.

Transverse support member 126 spans between side beams 20 to provide additional support for items on the storage rack 10. The ends 128 (see FIG. 4, one shown) of the transverse support member 126 have projections 130 extending outward and downward. The projections 130 extend into vertical slots 120 formed in the vertical leg 80 of the side beam 20. A downward force on the transverse member 126 secures the projections 130 in place in the side beam 20.

Roller tracks 132 and dividers 134 can be mounted in the shelf 12, between the front and rear beams 16, 18. In a preferred construction, the roller tracks 132 and dividers 134 are mounted to the front and rear beams 16, 18 using legs 136 as disclosed in Highsmith, U.S. Pat. No. 4,909,402. Legs 136 have an outward spring action which secures the clip 137 under shoulder 51, as shown in FIG. 2.

A plurality of shelves 12 can be mounted to upright support columns 14 to create layers of shelves. The shelves 12 are mounted to the front and rear upriqht support columns 14, 15 preferably using U-clips 138, which insert into apertures 140 spaced along the side 142 of the upright support columns 14, 15. The U-clips 138 engage the side beam 20 at the notches 118 located on the downturned flange portion 84. The shelves 12 can be mounted in a horizontal orientation, as shown in FIG. 1, or in an inclined orientation (not shown) to facilitate access to items stored thereon.

From the foregoing it will be observed that numerous modifications can be effected without departing from the true spirit and scope of the novel concepts of the present invention. It will be understood that no limitation with respect to the specific embodiment illustrated herein is intended or should be inferred. It is, of course, intended to cover by the appended claims all such modifications as fall within the scope of the claims.

What is claimed is:

1. A storage rack having a plurality of storage bays, each bay comprising:
   a. a plurality of upright columns including front columns and rear columns;
   b. a plurality of generally horizontally extending vertically spaced shelves within each bay, each said shelf including at least two side beams, a front beam, and a rear beam, each of said side beams having a front portion and a rear portion, each said front and rear portions having a notch extending horizontally therein, at least one of said front and rear beams having an external lip, said external lip having notches therein coacting with one of the notches of said side beams; and
   c. at least one of said front and rear beams extending between at least two adjacent bays and being formed to define a continuous wire track to establish a path for a wire extending therethrough.

2. The storage rack of claim 1 wherein:
   (a) the external lip of at least one of said front and rear beams comprises a horizontal wall and an upturned vertical wall, said upturned vertical wall forming alternating upright generally T-shaped projections and inverted generally T-shaped notches along the length of said vertical wall; and
   (b) each of said notches of said side beams defines a horizontal portion and a vertical portion, said horizontal portion engaging said horizontal wall of said external lip of at least one of said front and rear beams, and said vertical portion engaging said inverted generally T-shaped notches of said upturned vertical wall of said front and rear beams.

3. The storage rack of claim 2 wherein roller tracks are disposed between said front and rear beams, said roller tracks having legs engagable with said upright generally T-shaped projections of said front and rear beams.

4. The storage rack of claim 2 wherein at least one divider is disposed between said front and rear beams, said divider having legs engagable with said upright generally T-shaped projections of said front and rear beams.

5. The storage rack of claim 1 wherein at least one of said front and rear beams having an internal lip formed to define said continuous wire track.

6. A storage rack having a plurality of storage bays, each bay comprising:
   a. a plurality of upright columns including front columns and rear columns;
   b. a plurality of generally horizontally extending vertically spaced shelves within each bay, each said shelf including at least two side beams, a front beam, and a rear beam, each of said side beams having a front portion and a rear portion, each said front and rear portions having a notch extending horizontally therein, each of said front and rear beams having an external lip, said external lip having notches therein coacting with one of the notches of said side beams; and
   c. at least one of said front and rear beams extending between at least two adjacent bays, and being formed to define a continuous wire track to establish a path for a wire extending therethrough.

7. The storage rack of claim 6 wherein:
   (a) the external lip of each of said front and rear beams comprises a horizontal wall and an upturned vertical wall, said upturned vertical wall forming alternating upright generally T-shaped projections and inverted generally T-shaped notches along the length of said vertical wall; and
   (b) each of said notches of said side beams defines a horizontal portion and a vertical portion, said horizontal portion engaging said horizontal wall of said external lip of said front and rear beams, and said vertical portion engaging said inverted generally T-shaped notches of said upturned vertical wall of said front and rear beams.

8. The storage rack of claim 7 wherein roller tracks are disposed between said front and rear beams, said roller tracks having legs engagable with said upright generally T-shaped projections of said front and rear beams.

9. The storage rack of claim 7 wherein at least one divider is disposed between said front and rear beams, said divider having legs engagable with said upright generally T-shaped projections of said front and rear beams.

10. The storage rack of claim 6 wherein at least one of said front and rear beams having an internal lip formed to define said continuous wire track.

11. A storage rack, having a plurality of storage bays, each bay comprising:
    a. a plurality of upright columns including front columns and rear columns;
    b. a plurality of generally horizontally extending vertically spaced shelves within each bay, each said shelf including at least two side beams, a front beam, and a rear beam;
    c. each of said front and rear beams comprising an inverted generally V-shaped channel having an external lip, said external lip having a horizontal wall and an upturned vertical wall, said vertical wall forming alternating upright generally T-shaped projections and inverted generally T-shaped notches;
    d. each of said side beams comprising a generally C-shaped channel having a front portion and a rear portion, each of said front and rear portions having a notch extending horizontally into an upturned vertical portion therein, said vertical portion engaging said inverted generally T-shaped notches of said upturned vertical wall of said front and rear beams; and
    e. said front beam extending between at least two adjacent bays, and being formed to have a continuous wire track to establish a path for a wire extending therethrough.

12. The storage rack of claim 11 wherein roller tracks are disposed between said front and rear beams, said roller tracks having legs engagable with said upright generally T-shaped projections of said front and rear beams.

13. The storage rack of claim 11 wherein at least one divider is disposed between said front and rear beams, said divider having legs engagable with said upright generally T-shaped projections of said front and rear beams.

14. The storage rack of claim 11 wherein said front beam having an internal lip formed to define said continuous wire track.

15. A storage rack, having a plurality of storage bays, each bay comprising:

a. a plurality of upright columns including front columns and rear columns;
b. a plurality of generally horizontally extending vertically spaced shelves within each bay, each said shelf including at least two side beams, a front beam, and a rear beam;
c. each of said front and rear beams comprising an inverted generally V-shaped channel having an external lip, said external lip having a horizontal wall and an upturned vertical wall, said vertical wall forming alternating upright generally T-shaped projections and inverted generally T-shaped notches;
d. each of said side beams comprising a generally C-shaped channel having a front portion and a rear portion, each of said front and rear portions having a notch extending horizontally into an upturned vertical portion therein, said vertical portion engaging said inverted generally T-shaped notches of said upturned vertical wall of said front and rear beams;
e. said front beam extending between at least two adjacent bays, having an internal lip formed to define a wire track to establish a path for a wire extending therethrough;
f. at least two roller tracks disposed between said front and rear beams, said roller tracks having legs engagable with said upright generally T-shaped projections of said front and rear beams; and
g. at least one divider disposed between said front and rear beams, said divider having legs engagable with said upright generally T-shaped projections of said front and rear beams.

16. A storage rack comprising:
a. a plurality of upright columns including front columns and rear columns;
b. a plurality of generally horizontally extending vertically spaced shelves, each said shelf including at least two side beams, a front beam, and a rear beam, each of said side beams having a front portion and a rear portion, each said front and rear portions having a notch extending horizontally therein, at least one of said front and rear beams having an external lip, said external lip having notches therein coacting with one of the notches of said side beams; and
c. at least one of said front and rear beams being formed to define a continuous wire track to establish a path for a wire extending therethrough.

* * * * *